(12) United States Patent
Crichlow

(10) Patent No.: US 11,289,234 B2
(45) Date of Patent: *Mar. 29, 2022

(54) CAPSULE SYSTEM FOR DEEP GEOLOGIC DISPOSAL OF NUCLEAR WASTE

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/936,245

(22) Filed: Mar. 26, 2018

(65) Prior Publication Data

US 2019/0295735 A1 Sep. 26, 2019

(51) Int. Cl.
*G21F 9/36* (2006.01)
*B09B 1/00* (2006.01)

(52) U.S. Cl.
CPC .............. *G21F 9/36* (2013.01); *B09B 1/008* (2013.01)

(58) Field of Classification Search
CPC .................................. G21F 9/36; B09B 1/008
USPC ............................................................ 588/2
See application file for complete search history.

(56) References Cited

U.S. PATENT DOCUMENTS

| | | |
|---|---|---|
| 5,850,614 A | 12/1998 | Crichlow |
| 6,238,138 B1 | 5/2001 | Crichlow |
| 8,933,289 B2 | 1/2015 | Crichlow |
| 10,427,191 B2 * | 10/2019 | Crichlow ................ G21F 9/301 |

* cited by examiner

*Primary Examiner* — Edward M Johnson
(74) *Attorney, Agent, or Firm* — Eric Kelly

(57) ABSTRACT

Systems and methods for long-term disposal of high-level nuclear waste in deep geologic formations may include largely intact spent nuclear fuel rod assemblies that may be placed into waste-capsules (e.g., carrier tubes); which may then be placed into various well boreholes. Example embodiments may provide waste-capsules capable of containing and disposing of nuclear waste generated from spent nuclear fuel; including methods for harvesting the nuclear waste from cooling pools and/or surface storage; and operationally processing the waste, fuel assemblies for inclusion in the waste-capsules with various engineered barriers; along with storage in relatively large substantially horizontal well boreholes; which may be drilled into closed deep geologic formations.

19 Claims, 10 Drawing Sheets

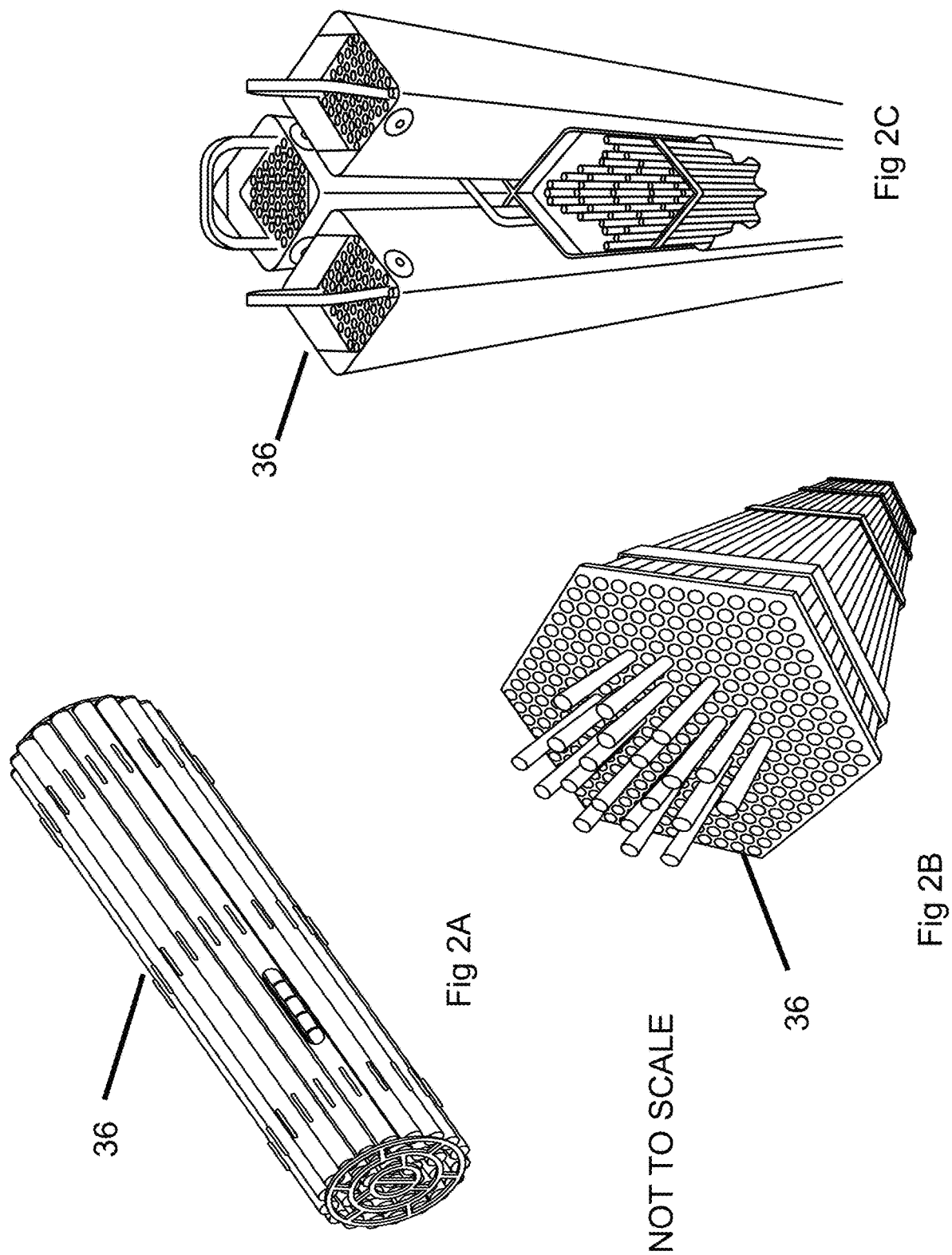

CAPSULE SYSTEM FOR DEEP GEOLOGIC DISPOSAL OF NUCLEAR WASTE

PRIORITY NOTICE

The present application claims priority under 35 U.S.C. § 120 to U.S. non-provisional patent application Ser. No. 15/480,504 filed on Apr. 6, 2017. This patent application is a continuation-in-part (CIP) application of the co-pending application Ser. No. 15/480,504 filed on Apr. 6, 2017. The present application is related to previous patents by the same inventor related to the disposal of nuclear waste in deep underground formations. These patents are: U.S. Pat. Nos. 5,850,614, 6,238,138, and 8,933,289. The disclosures of all of these patents and co-pending patent application are all incorporated herein by reference in their entirety.

TECHNICAL FIELD OF THE INVENTION

The present invention relates generally to disposing of nuclear waste and more particularly, to: (a) the operations of nuclear waste disposal; and (b) utilization of specialized capsules or containers for nuclear waste which may be sequestered in lateral wellbores drilled into deep geologic formations, such that, the nuclear waste is disposed of safely, efficiently, economically and in addition, if required, may be retrieved for various reasons.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today (circa 2018) there is an enormous quantity of nuclear waste accumulating across the world. In the US alone there are more than 70,000 metric tons (MT) of high-level solid waste (HLW) being stored in cooling pools and in concrete casks on the surface. This surface operation is very costly typically costing hundreds of millions of dollars annually. The HLW is generally called spent nuclear fuel (SNF) and consists of thousands of nuclear fuel assemblies which have been removed from operating nuclear power plants. These fuel assemblies are highly radioactive and also thermally active and continue to generate sensible heat which must be safely removed by maintaining these assemblies in cooling tanks at the onsite surface storage site. There are approximately 80,000 individual fuel assemblies being stored today in the US and about 15,000 MT being added annually. There is a significant need for new mechanisms and processes to safely get rid of the surface storage of this radioactive waste and to sequester this SNF waste in a safe manner.

In this application "HLW" and "SNF" are used interchangeably to describe the solid nuclear waste product. Also, the terms "nuclear fuel assemblies" and "control rod assemblies" are used interchangeably. In this application the terms "capsule" and "canister" may be used interchangeably with the same meaning.

Current scientific knowledge teaches that the conversion of nuclear waste to an acceptable waste form requires either, (a) that the wastes be separated from the other constituents and processed separately, or (b) that the wastes together with the other constituents be processed together. Both processes present a variety of technical challenges. Due to the radioactivity and toxicity of the wastes, separation can be both hazardous, very expensive and prone to human-induced accidental problems.

To date, and based on the prior art, in order to provide a satisfactory and economical final disposal of these wastes, it is desirable that the wastes be processed into a final form without the hazardous and expensive step of removing the other constituents. It has been understood that the waste in this final form prevents removal of the fissile constituents of the wastes and further immobilizes the waste to prevent degradation and transport of the waste by environmental mechanisms.

Several methods for providing an acceptable final form for waste are known in the art, including: (a) vitrification, and (b) ceramification. The cost associated with these two primary methodologies is prohibitive. Published information from the US Hanford Nuclear facility which is designed for vitrification operations has a projected cost level of $16 Billion.

Recent significant changes in several areas of nuclear technology and oil well drilling operations have provided at least some of the critical elements which may be some of the bases of embodiments of this subject application. These changes may be:

(1) The increased ability of the drilling industry to implement massively powerful and effective "hole-openers" or "hole-enlargers" devices in deep lateral well drilling has led to very large lateral wellbores to be drilled and economically implemented in solid rock formations. Some such hole-openers are capable of drilling wellbores that are up to 48 inches or more in wellbore diameter;

(2) The increasing emphasis in developing and using Small Modular Reactors (SMRs) for nuclear power generation has produced a set of novel configurations and types of control fuel rod assemblies, some of which are smaller in diameter and are shorter in length than those currently implemented in existing large nuclear power plant fuel systems.

An additional benefit to the nuclear waste industry that is contemplated by this invention is that by using intact fuel rod assemblies, i.e., "non-disassembled", in the embodiments of this invention there is no need to reinvent equipment to handle the large quantities of fuel rod assemblies currently stored in surface facilities. This is a major economic, safety and operational benefit.

A large quantity of specialized and automatic equipment has already been developed and safety tested and used to collect, transport and manipulate the fuel rod assemblies in the fueling, refueling and storage processes which are normally involved in nuclear waste and nuclear fuel processing. In some embodiments, it is contemplated that re-purposing these existing tools used that much of these systems they can be modified easily and cost-effectively to remove the fuel rod assemblies from the storage and insert them into the newly manufactured nuclear waste disposal capsules as presented in these embodiments. Fuel rod assemblies are intricate assemblies and are also easy to manipulate with the use of robotic type systems which make the process of sequestering the fluid rods inside the capsules a straightforward and rather non-technical process.

Based on the inherent shortcomings of the prior art, there exists a critical need for an effective, economical method for developing and utilizing an acceptable nuclear waste process for nuclear waste products; a process that precludes the need for all the existing expensive, time-consuming and dangerous intermediate operations that are currently being used or contemplated to render the nuclear waste in a form that eventually, still has to be buried in deep underground repositories. An approach is needed that minimizes these intermediate steps. To solve the above-described problems, the present invention provides a system and method to dispose of the nuclear waste currently accumulating on the surface using a methodology that minimizes the intermediate and intervening operational steps and which also translates into lower overall economic costs for nuclear waste disposal.

The novel approach as taught in the application provides a methodology wherein the waste disposal operations go directly from the existing fuel assembly rod cooling ponds to the underground disposal repository with minimal additional effort and without the afore-listed intermediary steps of vitrification and ceramification. It is to these ends that the present invention has been developed.

BRIEF SUMMARY OF THE INVENTION

To minimize the limitations in the prior art, and to minimize other limitations that will be apparent upon reading and understanding the present specification, embodiments of the present invention may describe systems and methods for storage of nuclear waste into closed and deep geological formations, using waste-capsules which may contain fully and functionally intact bundles of fuels rods.

The present invention is concerned with disposing of nuclear waste and, more specifically, to methods and/or systems of disposing of encapsulated nuclear waste in deep underground closed rock formations using multilateral horizontal boreholes connected to the surface by a vertical wellbore. More specifically, the invention describes methods and systems in which a novel capsule system and internment methodology are illustrated to provide a safe long-term nuclear waste repository.

An object of the present invention is to provide a method of disposing of nuclear waste in deep underground geologically stable and hydraulically closed rock formations.

It is possible to provide a method of disposing of the nuclear waste in underground rock formations which will bury the waste in generally horizontally extending lateral boreholes of relatively large diameters, positioned well below the earth's surface and thus very remote from the ecosphere. Some countries like Sweden, Finland, France and others are implementing nuclear waste disposal systems wherein the waste is buried in protective capsules that are positioned in comparatively shallow "mine-like" structures that are usually less than 2,000 feet below ground level.

In some embodiments, providing a waste-capsule in which the nuclear waste is further protected by a series of engineering and natural barriers may be utilized.

It is possible to provide methods of disposing of nuclear waste in deep closed underground rock formations wherein the design of the capsule provides several novel features which allow:

(a) personnel safety during surface transport of HLW;
(b) personnel safety on the surface during drilling and disposal working operations;
(c) economic and operational efficiencies in post-processing after waste accumulation at the power plants and prior to preparation of SNF for sequestering underground;
(d) long-term corrosion resistance while stored underground;
(e) long-term radionuclide protection to the environment;
(f) retrievability of the capsule and thus the HLW after emplacement even under severe adverse conditions;
(g) an additional object of the present invention is to provide a method in which the capsules can be disposed underground in a manner such that the waste generated heat load is optimally distributed such that the process remains stable over time and the heat load is below permissible limits; and/or
(h) an implementation of non-waste-bearing inline spacers to allow control of generated heat load in the waste repository.

Methods of disposing nuclear waste in underground rock formations are disclosed by the present invention. Such methods may comprise a step of selecting an area of land having a rock formation positioned there below. The rock formation must be of a depth, able to prevent radioactive material placed therein from reaching the surface by transport mechanisms over geologic times and must be at least a predetermined distance from active water sources. In some embodiments, the method may further include drilling a vertical wellbore from about 5,000 feet to about 30,000 feet deep from the surface of the selected area which extends into the underground rock formation. In some embodiments, a diameter of the vertical wellbore may be between about 10 inches and about 36 inches, plus or minus one inch.

The selected geologic formations should also be structurally closed and comprise sufficient distinct geologic layers of specific petrophysical properties such that the repository is stratigraphically impermeable to fluid migration.

In some embodiments, at least one primary horizontal lateral wellbore of length varying from 500 feet to 20,000 feet, may be drilled out from the vertical wellbore whereby the surface of the horizontal lateral is defined by the underground rock formation. In some embodiments, a diameter of the lateral well bores may vary from about 5 inches to about 48 inches, plus or minus one inch. Secondary laterals can be drilled off the initial primary lateral as needed to increase the total volumetric capacity of the disposal system. A steel casing is placed within the horizontal lateral and cemented in place by circulating cement in the annular space between the steel casing and the rock wall of the wellbore. Nuclear waste to be stored within the lateral is placed in a canister or capsule and the encapsulated nuclear waste is positioned within the primary horizontal lateral as described herein. The capsules are then sealed in place with appropriate means.

In some embodiments, a method may provide an operational method for fabricating at least one nuclear waste capsule. In this operational method the recommended tasks involved provide a more efficient methodology to allow safer, more economical and long lasting disposal of the nuclear waste in the deep underground repositories.

In some embodiments, a very significant existing consideration be addressed in long-term nuclear waste disposal process. It is the eventual degradation of the physical integrity of the wellbore system components. Some mechanisms are needed to minimize the degradation. A long-lived technology system is required to guarantee within technical certainty that the HLW can be contained adjacent and within the repository zone.

In some embodiments, a means may be utilized that may provide for very long-lived protection from degradation and migration of material away from the nuclear waste material. Stratigraphic and current structural geological analysis of underground oil formations which have historically produced heavy oil and other hydrocarbons indicate that tar-like deposits have existed for millions of years and have remained essentially unchanged and intact over time. In many cases the tar-like deposits actually formed an impermeable seal that prevented fluid flow across the rock matrix due to physical and chemical changes in the rock media.

Bitumen-like products and some petroleum-based products possess the qualities that make them capable of being utilized for low temperature sealing situations in the disposal of nuclear wastes. Other more temperature resistant chemical products are needed for higher temperature situations.

In many oil reservoirs, geologists have defined so-called "marker" beds of tar or high viscosity bitumen which are millions of years old. This geologic phenomenon illustrates the chemical stability of the hydrocarbon-based material over very long time periods, usually millions of years. This chemical stability of the tar-like material allows a selection of natural or similar synthetic hydrocarbons or hydrocarbon derivatives based materials as the long-lived high-temperature resistant layer used to surround the high-level waste material inside the capsules. This application provides for the use of such a medium in the protection of the (stored) HLW material.

The current invention teaches an improved engineered barrier system implemented in this application with the longest duration barrier, the protective medium at the innermost layer of protection. In a naturally occurring degradation process, the degradation beginning at the outermost layer in contact with the earth continues inwards into the central core of the system.

The outer protective layers, outer cement, outer steel pipe, inner cement, inner steel pipe, in this application all will degrade over varying time horizons. The inner-most tar-like medium has been historically demonstrated in the geological record, to be an effective fluid and migration barrier for millions of years. In numerical terms the cement and steel may degrade in 2,000 to 10,000 years, however the tar enclosed central nuclear waste core shall be protected for hundreds of thousands of years from contact with the biosphere. The combination of these two features sequentially allows for hundreds of thousands of years of radioactive protection of the biosphere from the effects of radionuclides in the waste materials.

The foregoing and other objects, advantages and characterizing features will become apparent from the following description of certain illustrative embodiments of the invention.

The novel features which are considered characteristic for the invention are set forth in the appended claims. Embodiments of the invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 2A may show a basic configuration of a nuclear fuel-rods-bundle (nuclear control rod fuel assembly) as generally currently in use in nuclear power generation.

FIG. 2B may show a basic configuration of a nuclear fuel-rods-bundle (nuclear control rod fuel assembly) as generally currently in use in nuclear power generation.

FIG. 2C may show a basic configuration of a nuclear fuel-rods-bundle (nuclear control rod fuel assembly) as generally currently in use in nuclear power generation.

REFERENCE NUMERAL SCHEDULE

Figure 1:
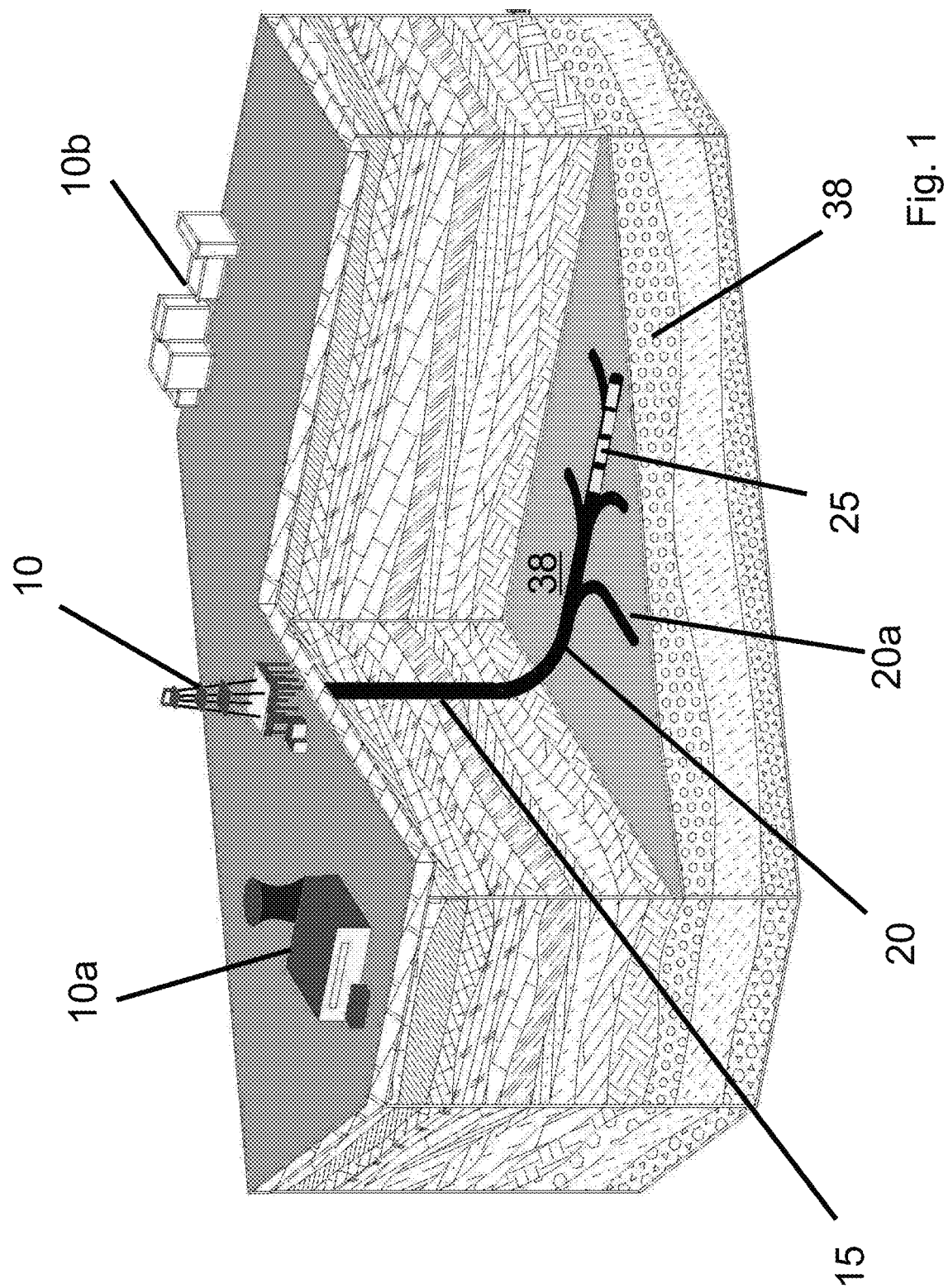
FIG. 1 may show an overview of the deep geological nuclear waste disposal system.

10 drilling-rig 10
10*a* nuclear power plant 10*a*
10*b* surface-storage-locations 10*b*
10*c* spiral type hole opener device 10*c*
10*d* canister type hole opener device 10*d*
15 vertical-wellbore 15

20 primary lateral wellbore 20
20a secondary lateral wellbore 20a
25 waste-capsule 25 (for HLW or SNF)
30a cement 30a (between inner and outer pipes)
30b cement 30b (between outer pipe and formation)
31 outer pipe 31
32 initial lateral borehole 32
33 inner pipe 33
33a mechanical plug 33a
34 carrier tube 34 (for HLW or SNF)
35 protective-medium 35
36 fuel rod assembly 36
36a fuel-rods-bundle 36a
37a centralizer 37a (for inner pipe)
37b centralizer 37b (for outer pipe)
38 deep-geological-formation 38 (for nuclear waste disposal)
39 support 39 (for fuel nuclear waste core)
40 pipe-coupling 40
42a injector port 42a
42b overflow port 42b
44 non-waste-bearing-spacer 44
600 method of handling nuclear waste 600
606 status of fuel rod assembly in surface storage 606
607 step of receiving fuel rod assembly from surface storage 607
608 step of maintaining intact fuel rod assembly 608
809 step of inserting nuclear waste core into carrier tube 809
811 step of supporting nuclear waste core 811
813 step of injecting protective-medium 813
815 step of sealing carrier tube 815
817 step of installing spacers between carrier tubes 817
819 step of joining carrier tubes via pipe couplings 819
821 step of inserting sealed carrier tubes into inner pipes into boreholes 821
823 step of finishing inserting sealed carrier tubes into inner pipes 823
825 step of drilling boreholes 825
827 step of loading outer pipes into boreholes 827
829 step of injecting cement 829
831 step of loading inner pipes into outer pipes 831
833 step of injecting cement 833
835 step of sealing boreholes 835

Note, the above reference numerals, with the exception of reference numerals 600, 606, 607, and 608, may also be disclosed and shown in co-pending U.S. non-provisional patent application Ser. No. 15/480,504 filed on Apr. 6, 2017, both of which share the same inventor.

DETAILED DESCRIPTION OF THE INVENTION

In this patent application the terms "HLW" and "SNF" describing nuclear (solid) waste may also be used interchangeably herein.

In this patent application the terms "capsule," "carrier tube," and "canister" may be used interchangeably with the same meaning. For example, "waste-capsule 25" and "carrier tube 34" may be used interchangeably.

In this patent application the terms "tube" and "pipe" may be used interchangeably and refer to cylindrical elements implemented in design and/or installation processes of some embodiments of the present invention.

Note, unless an explicit reference of "vertical wellbore" or "lateral wellbore" (i.e., "horizontal wellbore") accompanies "wellbore," use of "wellbore" herein without such explicit reference may refer to vertical wellbores or lateral wellbores, or both vertical and lateral wellbores.

In this patent application the terms "wellbore" and "borehole" may be used interchangeably. In some embodiments, initial lateral borehole 32 may be an example of primary lateral wellbore 20. In some embodiments, initial lateral borehole 32 may be an example of secondary lateral wellbore 20a. See e.g., FIG. 1 for primary lateral wellbore 20 and secondary lateral wellbore 20a. See e.g., FIG. 4A, FIG. 4B, FIG. 4C, FIG. 5, and FIG. 7 for initial lateral borehole 32. In addition, "wellbore metrics" may refer to parameters that may define a given wellbore such as, but not limited to, diameter, length, and azimuth.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1 may illustrate an inclusive overview of the nuclear waste disposal system and/or process. A surface drilling-rig 10 may be apparatus that drills vertical-wellbore 15, primary lateral wellbore 20, and/or secondary lateral wellbore 20a; and into which the waste-capsule(s) 25 may be disposed of in deep-geological-formation 38. In some embodiments, deep-geological-formation 38 may be located substantially from about 5,000 feet to about 30,000 feet below a terrestrial surface, plus or minus 1,000 feet. In some embodiments, deep-geological-formation 38 may have geologic properties that make storing nuclear materials relatively safe. For example, and without limiting the scope of the present invention, in some embodiments, deep-geological-formation 38 may have one or more of the following geologic properties: structural closure, stratigraphically varied, low porosity, low permeability, low water saturation, and reasonable clay content. For example, and without limiting the scope of the present invention, in some embodiments, primary lateral wellbore 20 (e.g., which may be an initial lateral borehole 32) may be located a predetermined depth of at least 10,000 feet below the surface. In some embodiments, waste-capsule 25 may store (e.g., contain) HLW (high-level solid waste) and/or SNF (spent nuclear fuel). Associated usually, but normally at distant remote locations, may be nuclear power plant 10a; and/or surface-storage-locations 10b for nuclear waste storage. In some embodiments, drilling-rig 10 may be a typical drilling rig as used in the oil-well drilling industry but with several updated modifications and features to allow safe handling of the radioactive waste (such as, HLW and/or SNF).

In some embodiments, while at least some portions of vertical-wellbore 15 may be substantially vertical with respect to a surface of the earth, at least some portions of primary lateral wellbore 20 may be substantially horizontal. In some embodiments, one or more primary lateral wellbores 20 may emanate (e.g., derive) from vertical-wellbore 15. In some embodiments, one or more secondary lateral wellbores 20a may emanate (e.g., derive) from primary lateral wellbores 20. In some embodiments, one or more waste-capsules 25 may be located, placed, and/or stored in one or more of primary lateral wellbores 20, secondary lateral wellbores 20a, and/or vertical-wellbores 15. In some embodiments, drilling-rig 10 may be used to form one or more of vertical-wellbores 15, primary lateral wellbores 20, and/or secondary lateral well-bores 20a.

In some embodiments, one or more of vertical-wellbores 15, primary lateral wellbores 20, and/or secondary lateral wellbores 20a may have predetermined diameters. For example, and without limiting the scope of the present invention, in some embodiments such wellbore diameters may be selected from the range of substantially six inches to substantially 48 inches, plus or minus one inch.

In some embodiments, one or more of vertical-wellbores 15, primary lateral wellbores 20, and/or secondary lateral wellbores 20a may have predetermined lengths. For example, and without limiting the scope of the present invention, in some embodiments such lengths may be selected from the range of substantially five hundred feet to substantially twenty-five thousand feet.

Some embodiments of the present invention may be focused on utilizing the least number of intermediary steps (e.g., preprocessing steps) in moving HLW and/or SNF from nuclear power plant 10a to deep-geological-formation 38.

FIG. 2A, FIG. 2B, and FIG. 2C may collectively illustrate types of nuclear fuel assemblies 36. These nuclear fuel assemblies 36 may vary in size and shape in actual practice and may have been specifically designed to optimize performance during power generation. Some nominal dimensions of these types of nuclear fuel rod assemblies 36 may be as follows: (a) square or rectilinear types are usually between 4 meters to 5 meters in length and about 14 cm to 22 cm in cross-section; and (b) nominal dimensions of the circular fuel rod assemblies are about 50 cm long and about 10 cm cross-section. Dimensions and geometries of nuclear fuel assemblies 36 are known and predetermined.

Figure 3A:
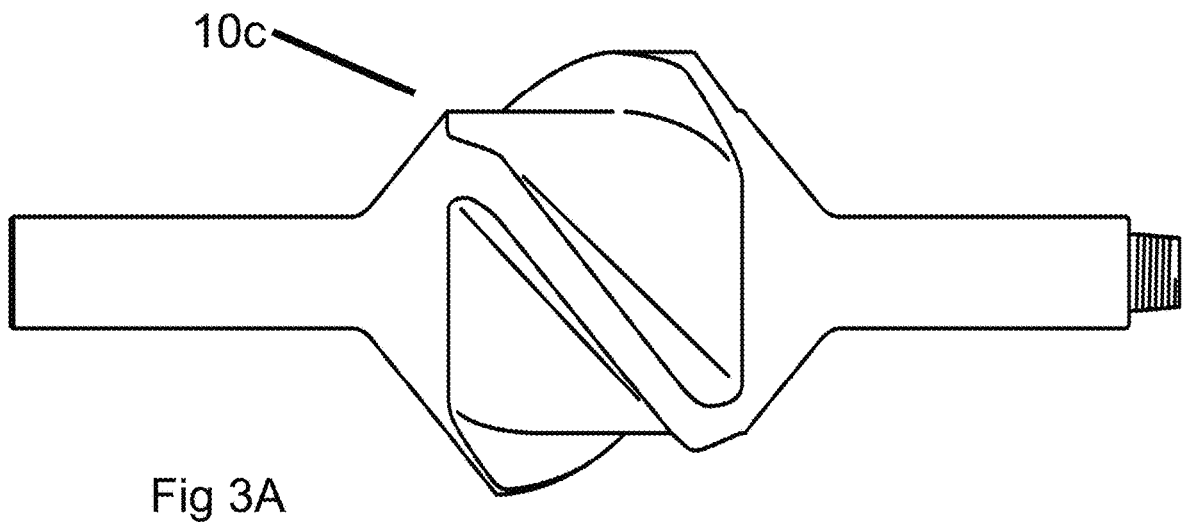
FIG. 3A may illustrate a type of hole opener or enlarger as is presently used successfully in deep wellbore drilling.
Figure 3B:
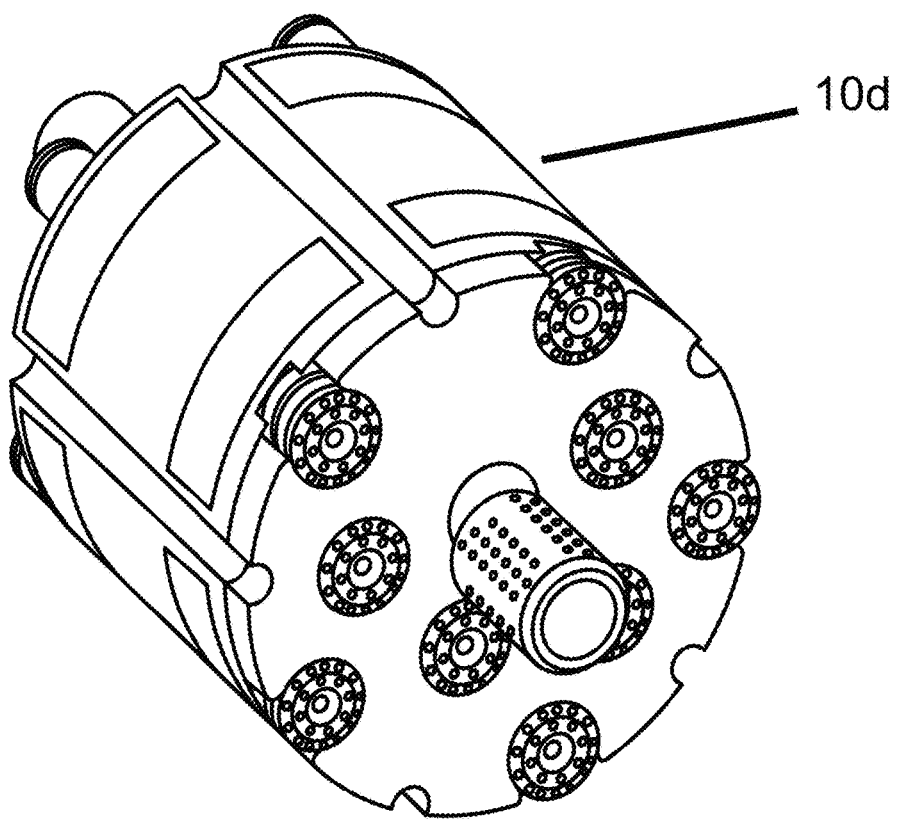
FIG. 3B may illustrate a type of hole opener or enlarger as is presently used successfully in deep wellbore drilling.

FIG. 3A and FIG. 3B may illustrate types of hole openers or hole enlargers, spiral type hole opener device 10c and "canister type hole opener device" 10d that have been developed by the oil-well drilling industry and/or also by the mining industry to enlarge the diameters of vertical and/or lateral wellbores.

In some embodiments, waste-capsule 25 may comprise two opposing terminal ends. In some embodiments, waste-capsule 25 may be an elongate member. In some embodiments, waste-capsule 25 may be a substantially cylindrical member. In some embodiments, waste-capsule 25 may be rigid to semi-rigid. See e.g., FIG. 7.

Figure 4A:
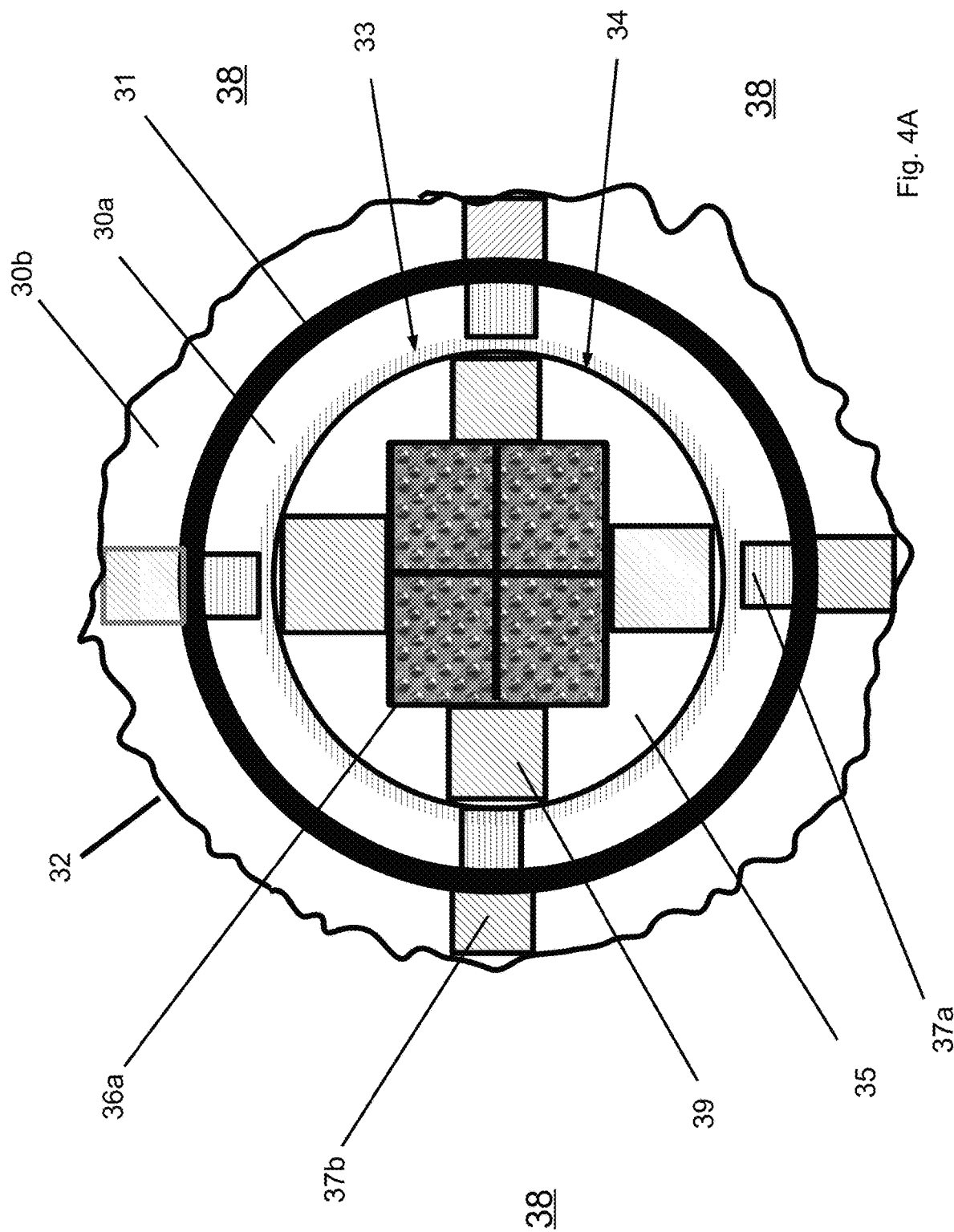
FIG. 4A may show a horizontal cross-section of in-situ installation of a given nuclear control fuel rod assembly in a given deep wellbore.
Figure 4B:
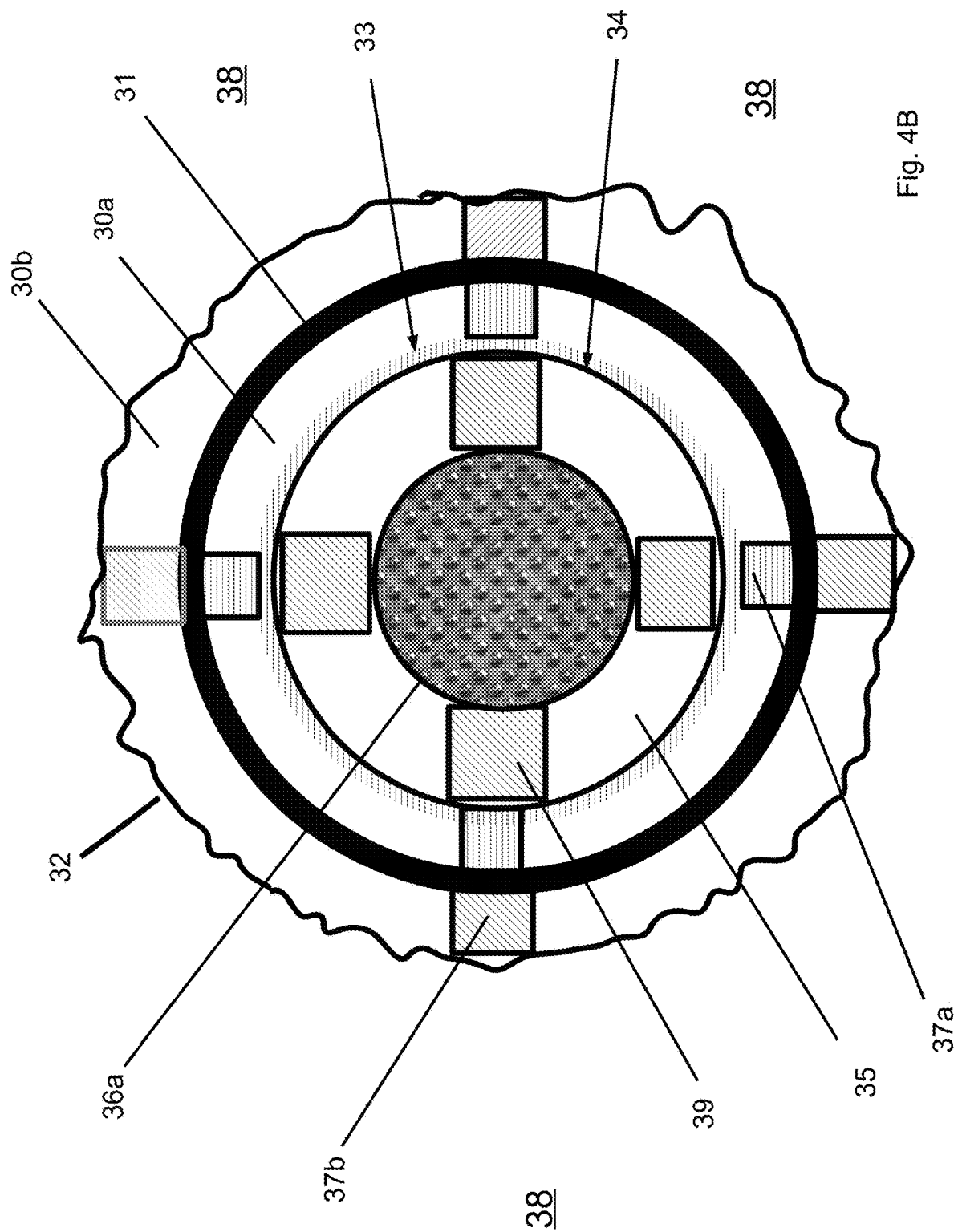
FIG. 4B may show a horizontal cross-section of in-situ installation of a given nuclear control fuel rod assembly in a given deep wellbore.
Figure 4C:
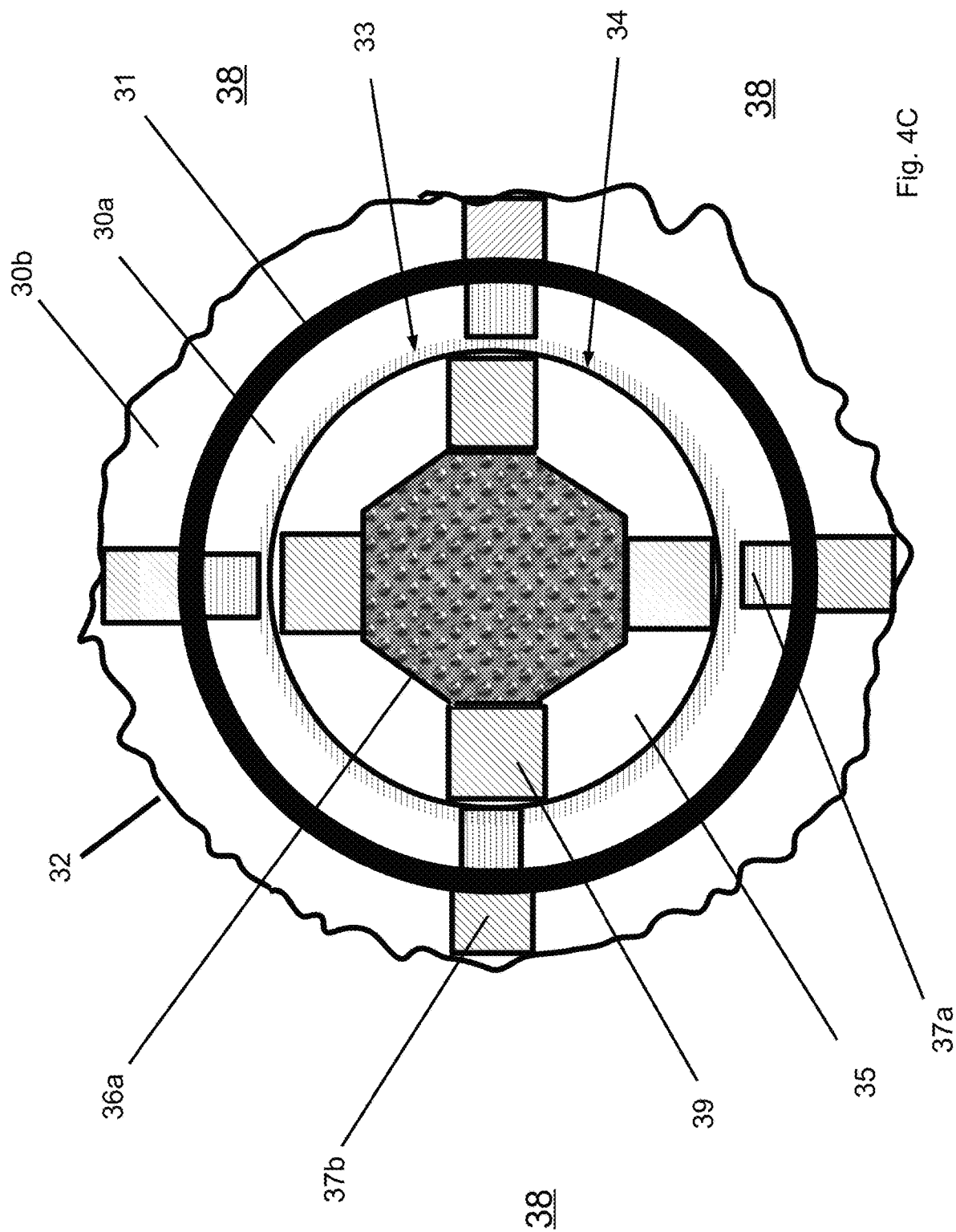
FIG. 4C may show a horizontal cross-section of in-situ installation of a given nuclear control fuel rod assembly in a given deep wellbore.

FIG. 4A, FIG. 4B, and FIG. 4C may illustrate transverse-width cross-sections of common nuclear fuel rod assembly 36 types as normally used in nuclear power plants 10a. FIG. 4A may illustrate a generally a square cross-section fuel rod assembly 36a. FIG. 4B may illustrate a generally circular type cross-section fuel rod assembly 36a. FIG. 4C may illustrate a rectilinear cross-section fuel rod assembly 36a. In some cases, in practice today, fuel rod assembly 36 may be constructed by piecing together two or more sub-assemblies of fuel-rods-bundles 36a to form an integral sub-assembly unit in which physical division-planes may be formed and demarcated. For example, and without limiting the scope of the present invention, a given fuel rod assembly 36 may be formed from four such fuel-rods-bundles 36a, as shown in FIG. 4A. Some embodiments of the present invention may utilize this inherent demarcation feature of fuel rod assemblies 36 to fashion a new and efficient means to safely solve waste disposal problems for SNF and/or HLW. A given fuel rod assembly 36 may be a complex apparatus comprising: metal fuel guides, channel fasteners, tie plates, expansion springs, locking tabs, metal channels, control rods, fuel rods, spacers, core plate assembly, lower tie plates, fuel support pieces, fuel pellets, end plugs, channel spacers, plenum springs, and the like.

Figure 5A:
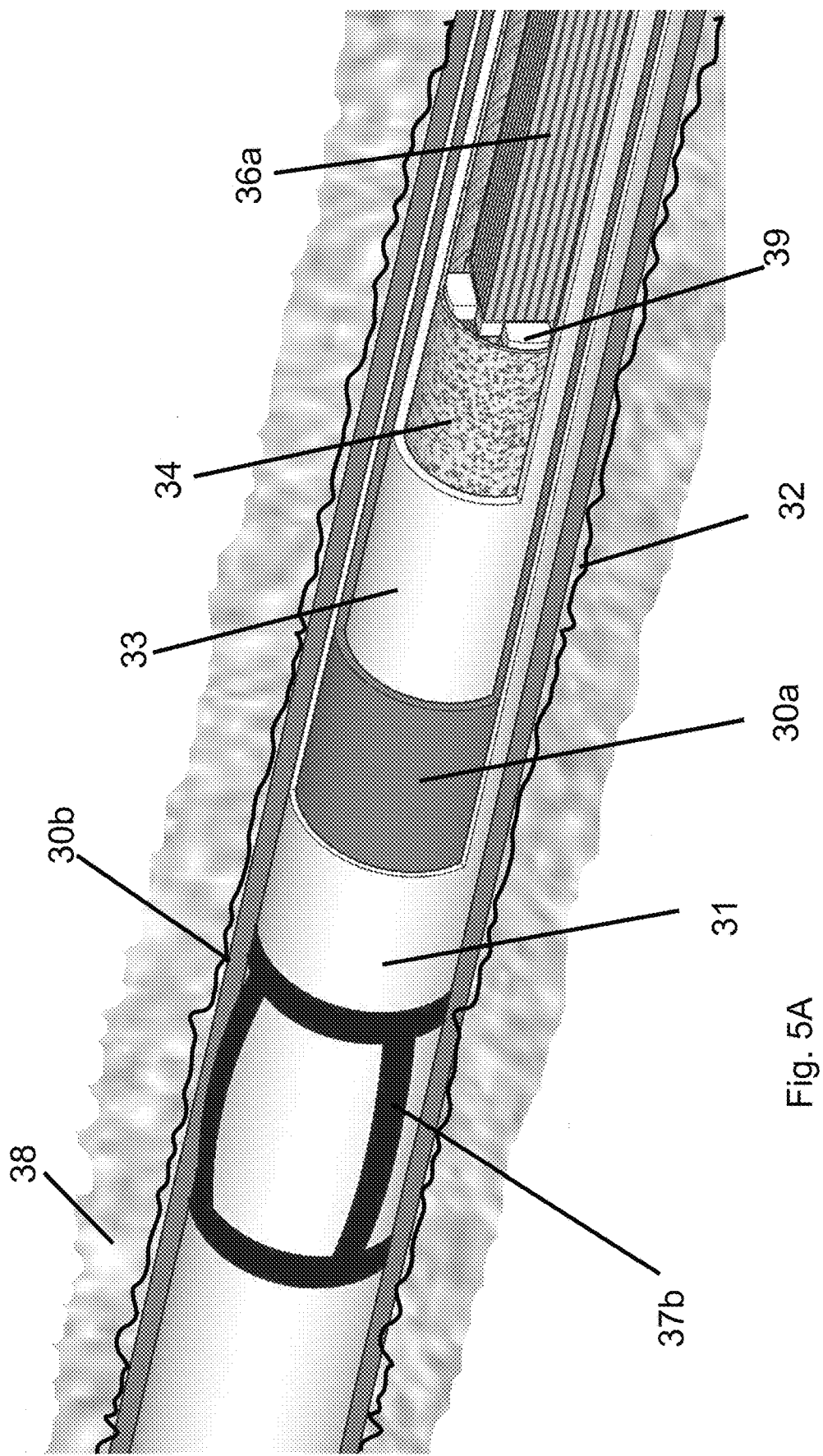
FIG. 5A may be a partial cutaway view of the nuclear waste capsule system in-ground showing a square nuclear fuel insert. Other types (geometries) of nuclear fuel inserts may be used in other embodiments.

FIG. 5A may illustrate a location of carrier tube 34 (waste-capsule 25) in deep-geological-formation 38 that may also show use of a centralizer 37b. In some embodiments, centralizer 37b may allow outer pipe 31 to "standoff" from initial lateral borehole 32 within deep-geological-formation 38. Note, see also FIG. 4A, FIG. 4B, and FIG. 4C for initial lateral borehole 32. Continuing discussing FIG. 5A in some embodiments, use of centralizer 37b around an outside portion of outer pipe 31 may then provide a substantially annular void space between outer surfaces of outer pipe 31 and surfaces of initial lateral borehole 32; which may then be substantially filled with cement 30b. In some embodiments, cement 30b may be injected as slurry into this substantially annular void space. In some embodiments, initial lateral borehole 32 may be a portion of primary lateral wellbore 20, secondary lateral wellbore 20a, and/or vertical-wellbore 15. In some embodiments, initial lateral borehole 32 may be formed from drilling hardware of drilling-rig 10. In some embodiments, outer pipe 31 may be a structural member. In some embodiments, outer pipe 31 may have a predetermined length and a predetermined diameter. In some embodiments, outer pipe 31 may be an elongate member; that may be substantially hollow. In some embodiments, outer pipe 31 may be a cylindrical member. In some embodiments, outer pipe 31 may be substantially rigid to semi-rigid. In some embodiments, outer pipe 31 may be substantially constructed from one or more of: a steel, steel-like alloy, stainless steel, copper, aluminum, zircalloy, combinations thereof, and/or the like. In some embodiments, outer pipe 31 may be described as at least one layer of pipe.

Continuing discussing FIG. 5A, in some embodiments, carrier tube 34 may have a predetermined length and a predetermined diameter. In some embodiments, carrier tube 34 may be an elongate member; that may be substantially hollow. In some embodiments, carrier tube 34 may be a cylindrical member. In some embodiments, carrier tube 34 may be substantially rigid to semi-rigid. In some embodiments carrier tube 34 may be substantially constructed from one or more of: a steel, steel-like alloy, stainless steel, copper, aluminum, zircalloy, combinations thereof, and/or the like. See e.g., FIG. 5A.

FIG. 5A also may show nuclear waste core 36a (i.e., fuel-rods-assembly 36a) or portions thereof housed within carrier tube 34. In some embodiments, carrier tube 34 may comprise one or more supports 39. In some embodiments, a given support 39 may be a structural member. In some embodiments, use of one or more supports 39 within carrier tube 34 may aid in positioning and/or locating nuclear waste core 36a (i.e., fuel-rods-assembly 36a) or portions thereof within carrier tube 34. In some embodiments, nuclear waste core 36a (i.e., fuel-rods-assembly 36a) may be suspended internally (e.g., coaxially) within carrier tube 34 by supports 39.

Figure 5B:
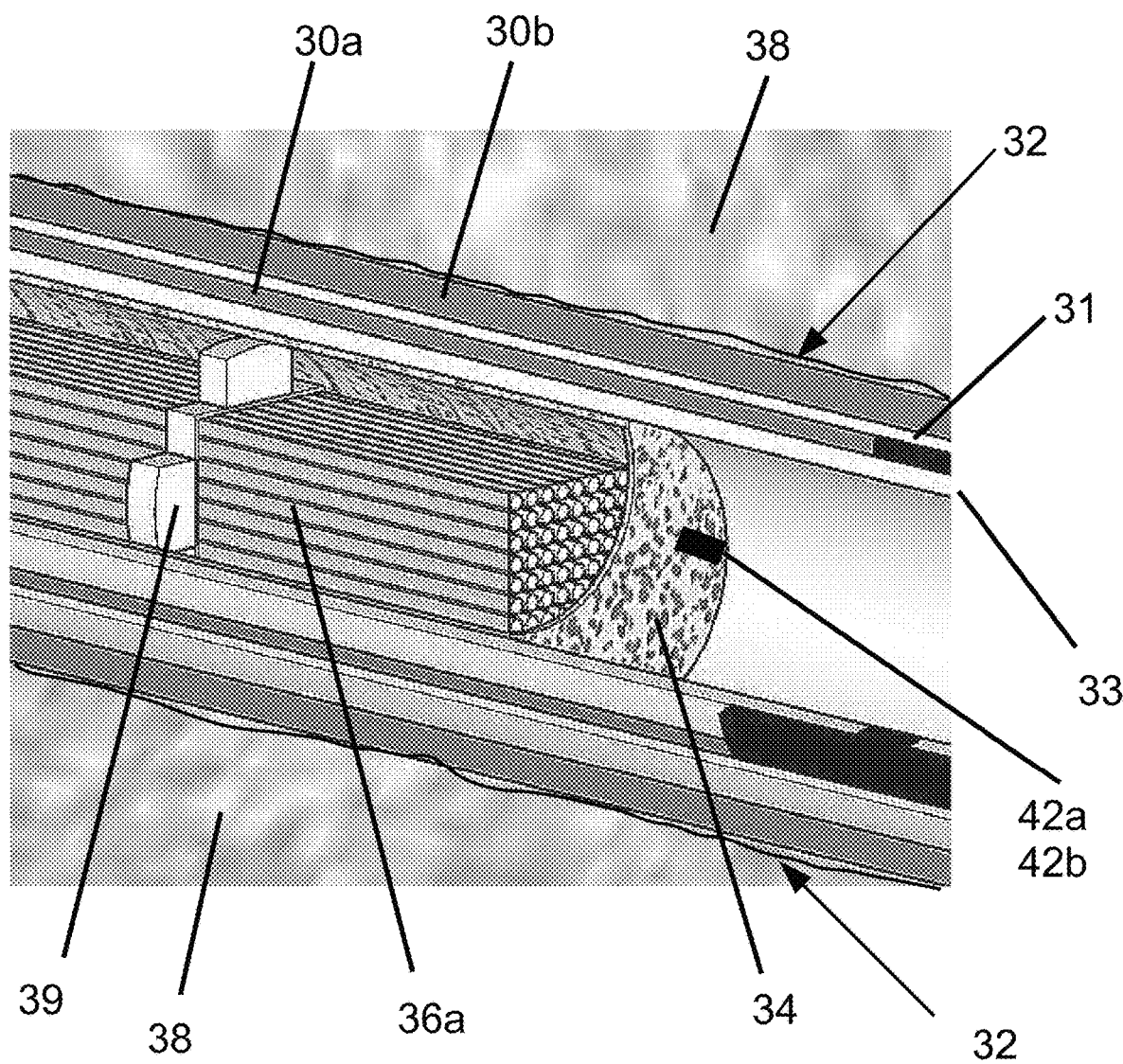
FIG. 5B may be a cutaway view of the nuclear waste capsule showing a location of an injector port on one terminal end of the capsule carrier tube and/or indicating an overflow port which may be located on the other terminal end of the waste capsule.

FIG. 5B may be a cutaway view of the nuclear waste capsule (i.e., fuel-rods-assembly 36a) showing a possible location of an injector port 42a on one terminal end of the capsule carrier tube 34 and/or indicating an overflow port 42b which may be located on the other opposing terminal end of the waste carrier tube 34. That is, in some embodiments, injector port 42a and overflow port 42b may be located on opposing terminal ends of carrier tube 34. In some embodiments, injector port 42a and overflow port 42b may be located on a same terminal end of carrier tube 34. In some embodiments, injector port 42a and/or overflow port 42b may comprise a valve. In some embodiments, injector port 42a and/or overflow port 42b may comprise a check-valve (i.e., a one-way valve). In some embodiments, injector port 42a and overflow port 42b may be a same port. In some embodiments, injector port 42a may allow loading (filling) of protective-medium 35 into carrier tube 34 and substantially around fuel-rods-assembly 36a. In some embodiments, overflow port 42b may allow drainage of excess of protective-medium 35 to drain from a given carrier tube 34.

FIG. 4A, FIG. 4B, and FIG. 4C may depict protective-medium 35 located substantially around fuel-rods-assembly 36a or substantially around portions thereof. In some embodiments, protective-medium 35 may be injected (e.g., pumped) into internal void volumes of carrier tube 34. In some embodiments, protective-medium 35 may substantially occupy internal volumes of carrier tube 34 that would otherwise be void space. In some embodiments, protective-medium 35 may help to seal fuel-rods-assembly 36a (e.g., SNF and/or HLW) within carrier tube 34. In some embodiments, protective-medium 35 may help to waterproof carrier tube 34. In some embodiments, due to densities and properties of protective-medium 35, protective-medium 35 may help to absorb radioactive emissions from fuel-rods-assembly 36a. In some embodiments, due to heat capacities of protective-medium 35, protective-medium 35 may help to absorb heat emissions from fuel-rods-assembly 36a. In some embodiments, protective-medium 35 may be substantially constructed from one or more: hydrocarbons, petroleum derivatives, high-temperature hydrocarbon derived products, tar, bitumen, heavy crude oil, bentonite clay suspensions, oils, slurries, combinations thereof, and/or the like.

Figure 6:
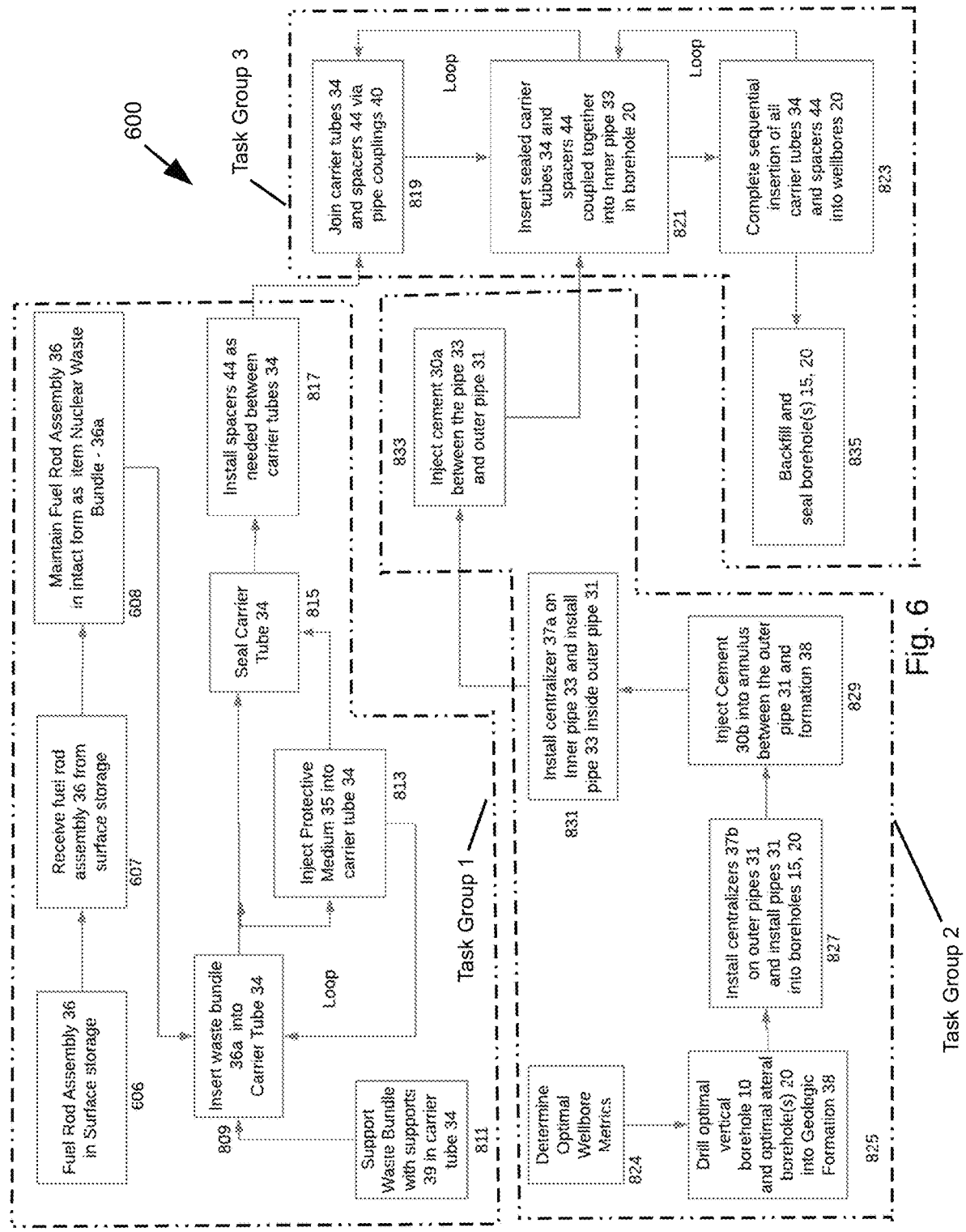
FIG. 6 is a flowchart illustrating the sequence of operations in processing the intact nuclear fuel rod assemblies harvested from the cooling pools and the insertion processes into the wellbores for final disposal and/or long term storage of the HLW/SNF.

FIG. 6 may depict a flowchart. The FIG. 6 flowchart may be summarized in three integrated groups of tasks. These task groups are as follows:

Task Group 1: Preparing the intact fuel rod assemblies, illustrated by steps: 606, 607, 608, 811, 809, 813, 815 and 817.

Task Group 2: Drilling the vertical and lateral wellbores, illustrated by steps: 824, 825, 827, 829, 831 and 833.

Task Group 3: Implementing or "landing" the completed nuclear waste capsules in the subject wellbores, illustrated in steps 819, 821, 823, 835.

"Landing" is an industry term which describes the operation of installing a device or system inside a wellbore system using surface equipment.

In some embodiments, method 600 may be a method for handling nuclear waste. In some embodiments, method 600 may be a method for processing fuel-rods-assembly 36a for subterranean storage in deep-geological-formations 38, according to one or more embodiments of the present invention. In some embodiments, method 600 may be a method for subterranean storage of nuclear waste in deep-geological-formations 38.

In some embodiments, Task Group 1 comprising steps 606 through 817 may occur away from subterranean storage location site; i.e., away from below where deep geological formation 38 may be located. In some embodiments steps 821 through step 835 may occur at or below the subterranean storage location site. See e.g., FIG. 6.

Continuing discussing FIG. 6, in some embodiments, fuel rod assemblies 36 may be stored at the surface, such as in storage pools. For example, nuclear waste from the nuclear power plants 10a may be stored at step 606 for long-term cooling for periods of several years, such as, between four and 30 years, or for up to 30 years or more in other embodiments. Such surface storage may be initially done in cooling pools; sometimes then later in casks or other massive protected containers on or near the surface.

In some embodiments, step 607 may be step of receiving fuel rod assemblies 36 from that surface storage (e.g., from cooling pools or casks). That is, in some embodiments, the receiving step 607 may be a harvesting step, as in a step of harvesting fuel rod assemblies 36 from the surface storage. In some embodiments, step 607 may transition in step 608.

Continuing discussing FIG. 6, in step 811 the NWC is supported inside the carrier tube 34.

In some embodiments, step 607 and/or step 608, 809, 811, 813, 815 may be automated and performed by robotics, to increase safety to personnel. Such automation may be shielded (radiation shielding) in some embodiments.

Continuing discussing FIG. 6, in some embodiments, step 813 may be a step of injecting protective-medium 35 into carrier tube(s) 34. In some embodiments, carrier tube(s) 34 may be pre-loaded with protective-medium 35, prior to insertion of nuclear fuel-rods-assembly 36a into the given carrier tube 34 via step 809. That is in some embodiments, step 813 may precede step 809. In such embodiments, insertion of nuclear fuel-rods-assembly 36a into carrier tube 34, may then force excess protective-medium out of that given carrier tube 34. And then step 809 may progress into step 815. That is, in such embodiments, step 813 may progress into step 809, which may then progress to step 815. Step 809 may still also follow step 805.

Whereas, in other embodiments, step 608 may progress to step 809, which may progress to step 813, which may progress to step 815. See FIG. 6.

Continuing discussing FIG. 6, in some embodiments, step 815 may be a step of sealing a given carrier tube 34 that may comprise nuclear fuel-rods-assembly 36a. In some embodiments, step 815 may involve sealing terminal ends of the given carrier tube 34 via welding. In some embodiments, step 815 may involve sealing terminal ends of the given carrier tube 34 with mechanical plug(s) 33a (see e.g., FIG. 7 for mechanical plug(s) 33a).

Continuing discussing FIG. 6, in some embodiments, step 815 may progress into step 817. In some embodiments, step 817 may be a step of installing spacers 44, as needed for heat management, between the now sealed carrier tube(s) 34 (with nuclear fuel-rods-assembly 36a). See e.g., FIG. 7. In such a manner a given waste-string may be formed. In some embodiments, a waste-string may comprise at least two carrier tubes 34 separated and attached to a common spacer 44. In some embodiments, step 817 may be optional. In some embodiments, where step 817 may be omitted, then step 815 may progress to step 819 or to step 821.

Continuing discussing FIG. 6, in some embodiments, step 817 may then progress into step 819. In some embodiments, step 819 may be optional or used as desired or used as necessary. In some embodiments, step 819 may be a step of joining carrier tubes 34 together via use of pipe-coupling(s) 40 (see e.g., FIG. 7 for pipe-coupling 40). In some embodiments, such carrier tubes 34 may already be linked (e.g., attached to each other) via spacers 44 (see e.g., FIG. 7 for non-waste-bearing-spacer 44), per step 817 as noted above. In some embodiments, step 819 may then progress into step 821.

Continuing discussing FIG. 6, in some embodiments, step 821 may be a step of inserting the sealed carrier tubes 34 into inner pipes 33 (see e.g., FIG. 4A, FIG. 4B, FIG. 4C, or FIG. 5 for inner pipes 33); and subsequently placing such inner pipes 33 into drilled boreholes. In some embodiments, step 815 may progress directly to step 821 (e.g., when spacers 44 and pipe-couplings 40 may not be used). In some embodiments, step 817 may progress directly to step 821 (e.g., when pipe-couplings 40 may not be used). In some embodiments, when step 819 progresses into step 821, then the sealed carrier tubes 34 that may be inserted into inner pipe(s) 33 may include use of spacers 44 and/or use of pipe-couplings 40. In some embodiments, step 821 may include use of mechanical plugs 33*a* (see e.g., FIG. 7 for mechanical plug(s) 33*a*) in inner pipes 33 at terminal ends of carrier tube(s) 34 also within that given inner pipe 33. Use of such mechanical plugs 33*a* may minimize unintended shifting of the inserted carrier tube(s) 34 within inner pipe(s) 33; e.g., during transportation of such loaded inner tube(s) 33 or during loading of the loaded inner pipe(s) 33. In some embodiments, as shown in FIG. 6, step 821 may also loop back onto step 819; for example, when inner pipes 33 may need to be joined via pipe-couplings 40.

Continuing discussing FIG. 6, in some embodiments, one or more of step 825, step 827, step 829, step 831, and/or step 833 may progress and lead to step 821. In some embodiments, step 825 may be a step of drilling the given borehole (s) by use of drilling-rig 10. In some embodiments, step 825 may yield one or more of: vertical-wellbore 15, primary lateral wellbore 20, secondary lateral wellbore 20*a*, and/or initial lateral borehole 32. In some embodiments, step 825 may result in one or more wellbores being drilled into deep-geological-formation 38.

Continuing discussing FIG. 6, in some embodiments, step 825 may progress into step 827. In some embodiments, step 827 may be a step of loading outer pipes 31 into the resulting boreholes from step 825. In some embodiments, loading of these outer pipes 31 into the resulting boreholes may also entail fitting such outer pipes 31 with centralizers 37*b*. See e.g., FIG. 4A, FIG. 4B, FIG. 4C, FIG. 5, and FIG. 7 for outer piper 31. See e.g., FIG. 4A, FIG. 4B, FIG. 4C, and FIG. 5 for centralizer 37*b*.

Continuing discussing FIG. 6, in some embodiments, step 827 may progress into step 829. In some embodiments, step 829 may be an injecting cement step; such a cement casing (see e.g., cement 30*b* in FIG. 4A) may be substantially formed in an annulus around outer pipes 31 and within boreholes (e.g., one or more of vertical-wellbore 15, primary lateral wellbore 20, secondary lateral wellbore 20*a*, and/or initial lateral borehole 32) that may house such outer pipes 31. In some embodiments, during step 829, cement (while in un-cured slurry form) may be pumped into and within the outer pipes 31, and subsequently forced out of an open bottom end of outer pipes 31, wherein such pressure may then force this cement slurry into the noted annular space. In some embodiments, step 829 may be a step of circulation of cement. In some embodiments, after such injected (e.g., pumped) cement per step 829 has sufficiently cured, interior portions of outer pipes 31 may be cleaned of undesirable residual cement; e.g., via use of wiper plugs.

Continuing discussing FIG. 6, in some embodiments, step 829 may progress into step 831. In some embodiments, step 831 may be a step of loading inner pipes 33 into outer pipes 31. In some embodiments, loading of these inner pipes 33 into outer pipes 31 may also entail fitting such inner pipes 33 with centralizers 37*a*; such axis of inner pipes 33 may be substantially concentric (coaxial) with respect to axis of outer pipes 31. See e.g., FIG. 4A, FIG. 4B, and FIG. 4C for centralizer 37*a*.

Continuing discussing FIG. 6, in some embodiments, step 831 may progress into step 833. In some embodiments, step 833 may be an injecting cement step; such that a cement layer (see e.g., cement 30*a* in FIG. 4*a*) may be substantially formed in an annulus around inner pipes 33 and within outer pipes 31 that may house such inner pipes 33. In some embodiments, during step 833, cement (while in un-cured slurry form) may be pumped into and within the inner pipes 33, and subsequently forced out of an open bottom end of inner pipes 33, wherein such pressure may then force this cement slurry into the noted annular space between the exterior of inner pipes 33 and the interior of outer pipes 31. In some embodiments, step 833 may be a step of circulation of cement. In some embodiments, after such injected (e.g., pumped) cement per step 833, interior portions of inner pipes 33 may be cleaned of undesirable residual cement; e.g., via use of wiper plugs. In some embodiments, step 833 may then progress into step 821; wherein waste-strings may be installed (inserted) to the inner pipes 33.

Continuing discussing FIG. 6, in some embodiments, step 821 may progress into step 823. In some embodiments, step 823 may be a step of finishing inserting the sealed carrier tubes 34 into the inner pipes 33; wherein these inner pipes 33 may already be installed into the outer pipes 31. In some embodiments, step 823 may be a step of completing sequential insertion of all carrier tubes 34 into inner pipes 33. In some embodiments, such carrier tubes may be with spacers 44 per step 817. In some embodiments, step 823 may loop back onto step 821 depending on the total number of carrier tubes to be inserted.

Continuing discussing FIG. 6, in some embodiments, step 823 may progress into step 835. In some embodiments, step 835 may be a step of sealing the various boreholes. Various backfills, including, but not limited to cement pours, may be used for this purpose.

In some embodiments, retrieval of subterranean stored waste-capsule(s) 25 (and/or carrier tube(s) 34) stored according to method 600 may be straightforward. In some embodiments, such subterranean stored waste-capsule(s) 25 (and/or carrier tube(s) 34) may be retrieved using an "overshot" fishing tool (e.g., as used in oilfield operations) and returned sequentially to the surface in a routine operation. Then once on the surface, protective-medium 35 inside a given carrier tube 34 and substantially surrounding the nuclear fuel-rods-assembly 36*a* may be removed by an efficient dissolution process with the appropriate solvents; and thus making nuclear fuel-rods-assembly 36*a* fully accessible, for various purposes, including research, investigation, observation, and/or available for re-processing, or relocation.

Figure 7:
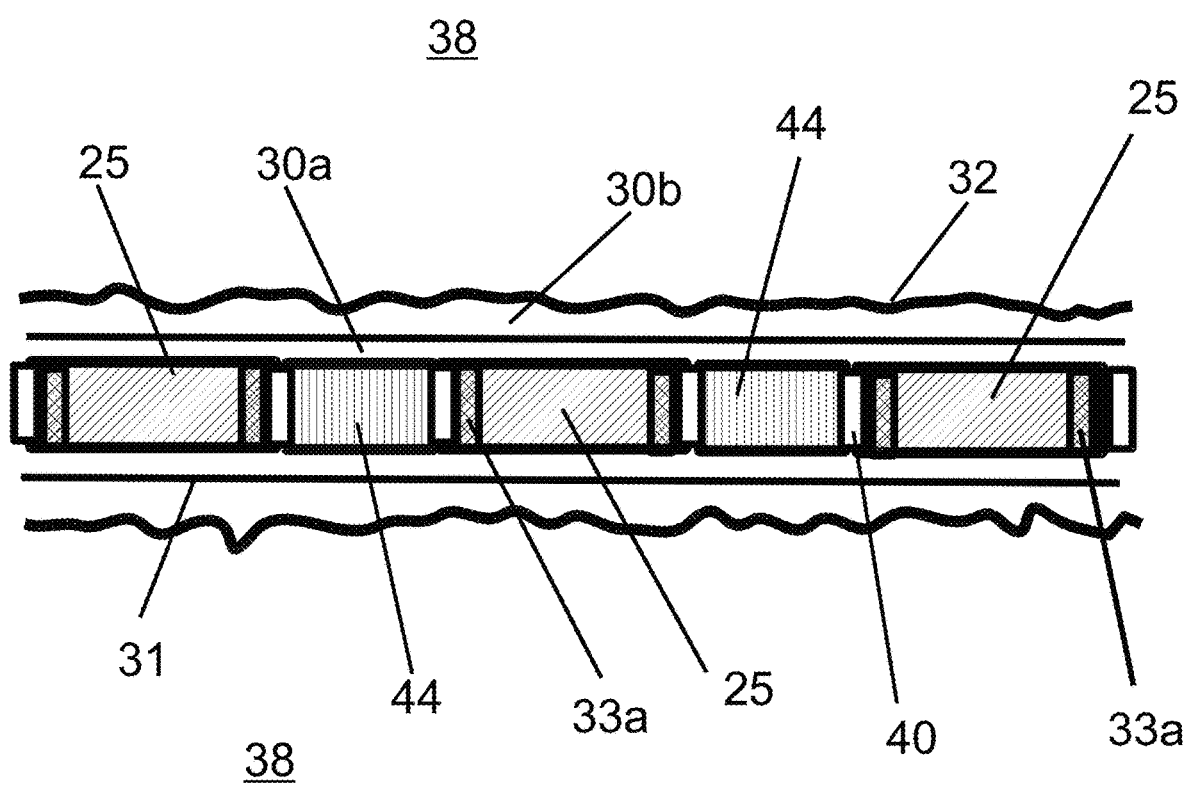
FIG. 7 may illustrate multiple capsules and connected devices which together make up the waste capsule string to be inserted into a given wellbore for long term HLW/SNF storage.

FIG. 7 may illustrate nuclear waste capsules 25, mechanical spacers 44, couplings 40, mechanical plugs 33*a* combined to form the mechanical string which is inserted inside the mechanical outer pipes 31 which are positioned inside the wellbore 32.

Continuing discussing FIG. 7, in some embodiments, waste capsules 25 may have a predetermined length and a predetermined diameter. In some embodiments, waste capsules 25 may be an elongate member; that may be substantially hollow. In some embodiments, waste capsules 25 may be a cylindrical member. In some embodiments, waste capsules 25 may be substantially rigid to semi-rigid. In some embodiments waste capsules 25 may be substantially constructed from one or more of: a steel, steel-like alloy, stainless steel, copper, aluminum, zircalloy, combinations thereof, and/or the like. See e.g., FIG. 7.

Systems and methods for deep geological storage of nuclear waste have been described. The foregoing description of the various embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for establishing at least one waste capsule system for long-term disposal of spent nuclear fuel into at least one underground basement rock structure, wherein the method comprises steps of:
   (a) inserting at least one intact spent nuclear fuel rod assembly, that comprises at least some spent nuclear fuel, into at least one waste capsule for use in the at least one waste capsule system, wherein the at least one waste capsule system comprises the at least one waste capsule;
   (b) limiting costs of the at least one waste capsule system;
   (c) establishing safety means for the at least one waste capsule system; and
   (d) implementing a result of the step (a) into the at least one underground basement rock structure.

2. The method according to claim 1, wherein the step (a) is carried out with automated robotic equipment.

3. The method according to claim 1, wherein prior to the step (a) the at least one waste capsule is at least partially preloaded with a protective medium, wherein the protective medium is configured to protect the at least one waste capsule from radioactive emissions of the at least some spent nuclear fuel, wherein the step (a) is then carried out into the protective medium that has been preloaded into the at least one waste capsule.

4. The method according to claim 3, wherein the protective medium completely surrounds the at least some spent nuclear fuel in the at least one waste capsule.

5. The method according to claim 3, wherein the protective medium is pumped into the at least one waste capsule by at least one port; wherein the at least one waste capsule comprises the at least one port.

6. The method according to claim 3, wherein the protective medium is selected from or more of: hydrocarbons, petroleum derivatives, high-temperature hydrocarbon derived products, tar, bitumen, heavy crude oil, bentonite clay suspensions, oils, slurries, or combinations thereof.

7. The method according to claim 1, wherein the step (b) comprises using at least one component for the at least one waste capsule system that is an off the shelf component used in an oil field industry.

8. The method according to claim 7, wherein the at least one component is selected from one or more of: the at least one waste capsule being a pipe of predetermined length and of predetermined radius; at least one casing pipe for surrounding the at least one waste capsule; at least one pipe coupling configured for linking two adjacent waste capsules together, wherein the two adjacent waste capsules are selected from the at least one waste capsule; at least one plug configured for sealing the at least one waste capsule; or combinations thereof.

9. The method according to claim 1, wherein the step (b) comprises using a minimum quantity of centralizers; wherein the at least one waste capsule system comprises the minimum quantity of centralizers; wherein a centralizer selected from the minimum quantity of centralizers is configured to keep the at least one waste capsule centered within a casing pipe or within a wellbore; wherein the casing pipe is located within the wellbore; wherein the wellbore is located within the at least one underground basement rock structure.

10. The method according to claim 1, wherein the step (b) comprises using automated robotic equipment for carrying out the step (a).

11. The method according to claim 1, wherein the step (b) comprises using an inexpensive protective medium to surround the at least some nuclear fuel within the at least one waste capsule; wherein the protective medium is configured to protect the at least one waste capsule from radioactive emissions of the at least some spent nuclear fuel.

12. The method according to claim 11, wherein at least some of the protective medium is preloaded into the at least one waste capsule before the step (a).

13. The method according to claim 11, wherein at least some of the protective medium is inserted into the at least one waste capsule by pumping.

14. The method according to claim 1, wherein the step (c) comprises housing the at least some spent nuclear fuel within a plurality of successive physical barriers, wherein the plurality of successive physical barriers comprises the at least one waste capsule; wherein the at least one waste capsule system comprises the plurality of successive physical barriers.

15. The method according to claim 14, wherein the plurality of successive physical barriers comprises, from an inner most location to an outermost location: a protective medium surrounding and in physical contact with the at least one intact spent nuclear fuel rod assembly; then the at least one waste capsule that is sealed around the protective medium; then at least one inner pipe casing around the at least one waste capsule; then a first layer of cement around the at least one inner pipe casing; then at least one outer pipe casing around the first layer of cement; then a second layer of cement around the at least one outer pipe casing; and then a wellbore around the second layer of cement, wherein the wellbore is located in the at least one underground basement rock structure.

16. The method according to claim 1, wherein the step (c) comprises carrying out the step (a) using automated robotic equipment that is shielded to minimize escape of radioactive emissions.

17. The method according to claim 1, wherein the step (c) comprises, after executing the step (a), sealing the at least one waste capsule with at least one plug; wherein the at least one waste capsule system comprises the at least one plug; wherein the sealing is done by welding and/or by mechanical means.

18. The method according to claim 1, wherein the step (c) comprises installing at least one spacer between two waste capsules; wherein the at least one waste capsule system comprises the at least one spacer; wherein the two waste capsules are selected from the at least one waste capsule; wherein the step (a) is carried out in both of the two waste capsules; wherein the at least one spacer is non-load bearing and not containing nuclear waste; wherein the at least one spacer minimizes degradation of the at least one waste capsule system due to heat generation within the two waste capsules.

19. The method according to claim 1, wherein the step (c) comprises minimizing executing a quantity of the step (d) by grouping a plurality of waste capsules into a string; wherein the at least one waste capsule comprises the plurality of waste capsules; wherein the step (a) is carried out on each waste capsule selected from the plurality of waste capsules; wherein the plurality of waste capsules are arranged in a serial fashion end to end, with adjacent waste capsules, selected from the plurality of waste capsules, being connected; wherein then the string is inserted into the at least one underground basement rock structure via at least one wellbore that is drilled into the at least one underground basement rock structure.

* * * * *